(12) United States Patent
Muscato et al.

(10) Patent No.: US 7,296,431 B2
(45) Date of Patent: Nov. 20, 2007

(54) APPARATUS AND METHOD FOR FREEZING FOOD PRODUCTS

(75) Inventors: Robert Muscato, Monmouth Junction, NJ (US); Robert Boddaert, Washington, NJ (US); Stephen A McCormick, Warrington, PA (US); John Hamilton, Edmond, OK (US)

(73) Assignee: The BOC Group, Inc., Murray Hill, NJ (US)

( * ) Notice: Subject to any disclaimer, the term of this patent is extended or adjusted under 35 U.S.C. 154(b) by 294 days.

(21) Appl. No.: 11/235,782

(22) Filed: Sep. 27, 2005

(65) Prior Publication Data

US 2006/0070393 A1     Apr. 6, 2006

Related U.S. Application Data

(60) Provisional application No. 60/615,214, filed on Oct. 1, 2004.

(51) Int. Cl.
*F25D 25/00* (2006.01)
(52) U.S. Cl. ............................. 62/380; 62/62
(58) Field of Classification Search ............... 626/62, 626/380
See application file for complete search history.

(56) References Cited

U.S. PATENT DOCUMENTS 2,223,972 A    12/1940   Sterling
3,166,383 A     1/1965   Morris
3,611,737 A *  10/1971   Alaburda et al. ............... 62/63
3,611,745 A *  10/1971   Schlemmer ................... 62/333
3,889,488 A *   6/1975   Maeda et al. .................. 62/218
4,171,625 A *  10/1979   Morgan et al. ............... 62/380
5,299,426 A     4/1994   Lermuzeaux

FOREIGN PATENT DOCUMENTS

| EP | 1 426 715 A1 | 6/2004 |
|---|---|---|
| GB | 518660 | 3/1940 |

* cited by examiner

*Primary Examiner*—Melvin Jones
(74) *Attorney, Agent, or Firm*—Bernard Lau

(57) ABSTRACT

An apparatus and method of cooling products includes a conveyor for transporting the products, through a refrigeration medium for cooling the products, agitation means disposed proximate to the conveyor for selective, intermittent contact with the conveyor to displace the conveyor from a plane of travel, thereby displacing the products on the conveyor during freezing to prevent the products from adhering to the conveyor or other of the products during freezing, at least one of the agitation means and the conveyor constructed and arranged to be positioned away from each other for the conveyor to move uninterrupted along the plane of travel.

33 Claims, 3 Drawing Sheets

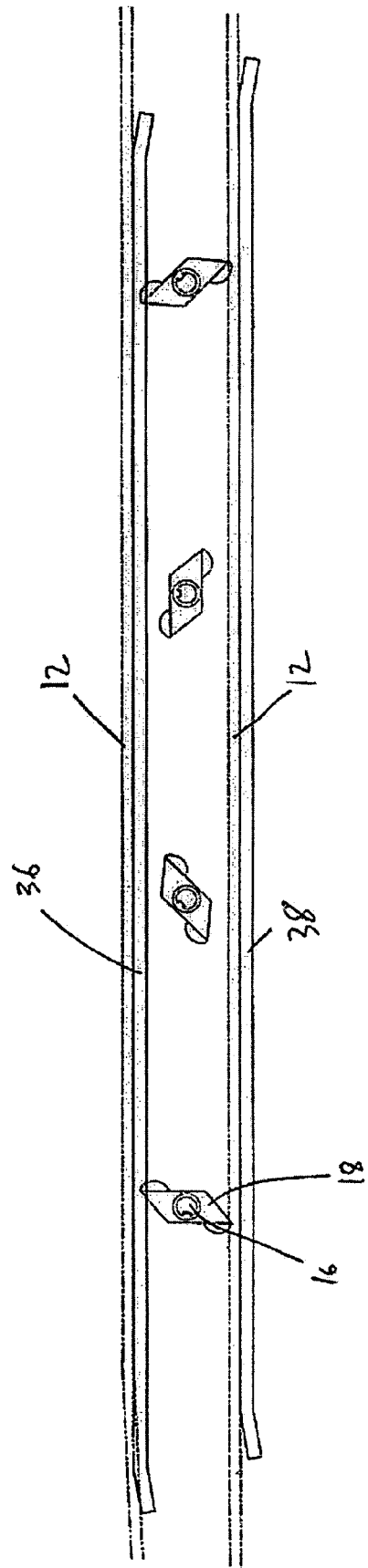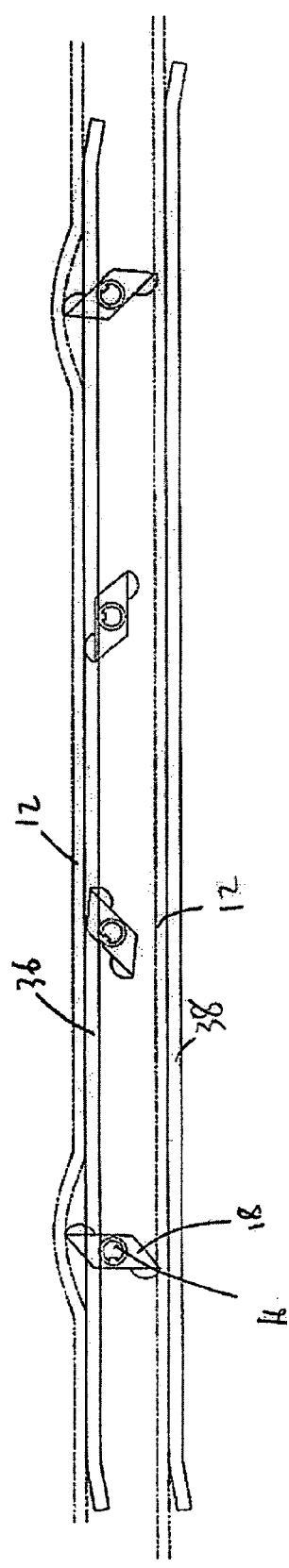

APPARATUS AND METHOD FOR FREEZING FOOD PRODUCTS

CROSS-REFERENCE TO RELATED APPLICATIONS

This application claims the benefit of the filing date of U.S. Provisional Application for Patent Application Ser. No. 60/615,214 filed Oct. 1, 2004, the disclosure of which is incorporated by reference herein.

FIELD OF THE INVENTION

The present invention relates to cooling and freezing food products.

BACKGROUND OF THE INVENTION

There are many ways in which products, such as food products, may be chilled or frozen. One example calls for the product to be placed into trays. In many cases, a tray is used to enhance the display of the product in the package. It may also be used to contain a fluid such as water or sauce to be chilled or frozen with the product. The tray is part of the final product packaging. Loading trays is labor intensive and is typically done for premium type products which will demand a higher price to offset the additional cost of production. The trays are then placed onto a rack, then placed into a chiller or freezer, or the trays are placed on a moving belt moving through a chiller or freezer.

Another type of freezing for a product is individual quick-frozen ("IQF"). IQF freezing of products provides products that are frozen, but not stuck together. There are several known ways that IQF product is produced. One process is to simply freeze the products without allowing same to contact each other. This may be done by spacing individual product on a freezer belt or rack so they are not in contact with each other. In most cases, this is not done for smaller products because it requires staff to arrange the product fed into the freezer and is an inefficient use of manpower and space, thus reducing capacity. Accordingly, as the pieces to become frozen become smaller, it becomes increasingly more time consuming and difficult to do. Another process is by placing the products into a tray or compartments, which is constructed to keep the individual pieces separated. This is not as desired a process due to the additional cost, labor and increased package size.

Other methods of producing IQF products include fluidized beds, nitrogen immersion or multi-pass tunnels. All of these allow for product to be randomly placed on a belt for freezing. Movement is created between adjacent pieces of product to prevent sticking, thereby creating IQF, to keep pieces of product moving in relation to one another. For example, in nitrogen immersion, the pieces are not permitted to contact each other when dropped into a nitrogen bath and are thereby frozen at the surface of the bath before they can contact and adhere to one another. Multi-pass tunnels (including flighted tunnels) drop the pieces from one belt to another repeatedly to break the product apart before it is frozen solid. However, none of these methods is suitable for processing product contained in trays, since known methods would scatter the trays and displace the product from the trays.

To efficiently process tray and IQF products, different types of equipment are employed which are suitable for one, but not both, freezing processes. In many cases, companies make both IQF and tray types of products and attempt to have both processed with the same equipment. Attempts to achieve this are done by removing or bypassing the IQF portion of the freezing line when tray product freezing is desired. This typically requires relocation of equipment and results in a reduction in production capacity due to the removal of part of the process line.

SUMMARY OF THE INVENTION

An apparatus for chilling or freezing products is provided including a conveyor for transporting the products through a refrigeration medium for chilling or freezing the products; agitation means disposed proximate to the conveyor for selective, intermittent contact with the conveyor to displace the conveyor from a plane of travel, thereby displacing the products on the conveyor during chilling or freezing to prevent the products from adhering to the conveyor or other of the products during chilling or freezing, at least one of the agitation means and the conveyor constructed and arranged to be positioned away from each other for the conveyor to move uninterrupted along the plane of travel; and drive means operatively associated with the agitation means to move the agitation means to displace the conveyor and the products thereon.

An apparatus for cooling products is provided including a conveyor for transporting the products through a refrigeration medium for cooling the products; an agitation assembly that interchangeably engages with the conveyor for selective, intermittent contact with the conveyor so as to displace the conveyor from the plane of travel, or disengages from the conveyor thereby enabling the conveyor to move uninterrupted along the plane of travel; and drive means operatively associated with the agitation means to engage or disengage the agitation means to displace the conveyor and the products thereon.

A method of individually quick freezing products is provided which comprises conveying products on a conveyor in a freezing zone; providing freezing means to the freezing zone; and providing agitating means to selectively displace the conveyor along at least part of the conveyed path of travel to prevent the products from adhering to the conveyor or to each other during freezing; wherein at least one of the agitating means and the conveyor are constructed and arranged to be positioned away from the other for the conveyor to move uninterrupted along the conveyed path of travel.

BRIEF DESCRIPTION OF THE DRAWINGS

For a more complete understanding of the present invention, reference may be had to the accompanying FIGS., of which:

FIG. 4 shows a view of the conveyor disengaged from the agitation means of the apparatus in FIG. 1.

FIG. 5 shows a view of the conveyor engaged to the agitation means of the apparatus in FIG. 1.

DETAILED DESCRIPTION OF PREFERRED EMBODIMENTS

Figure 1:
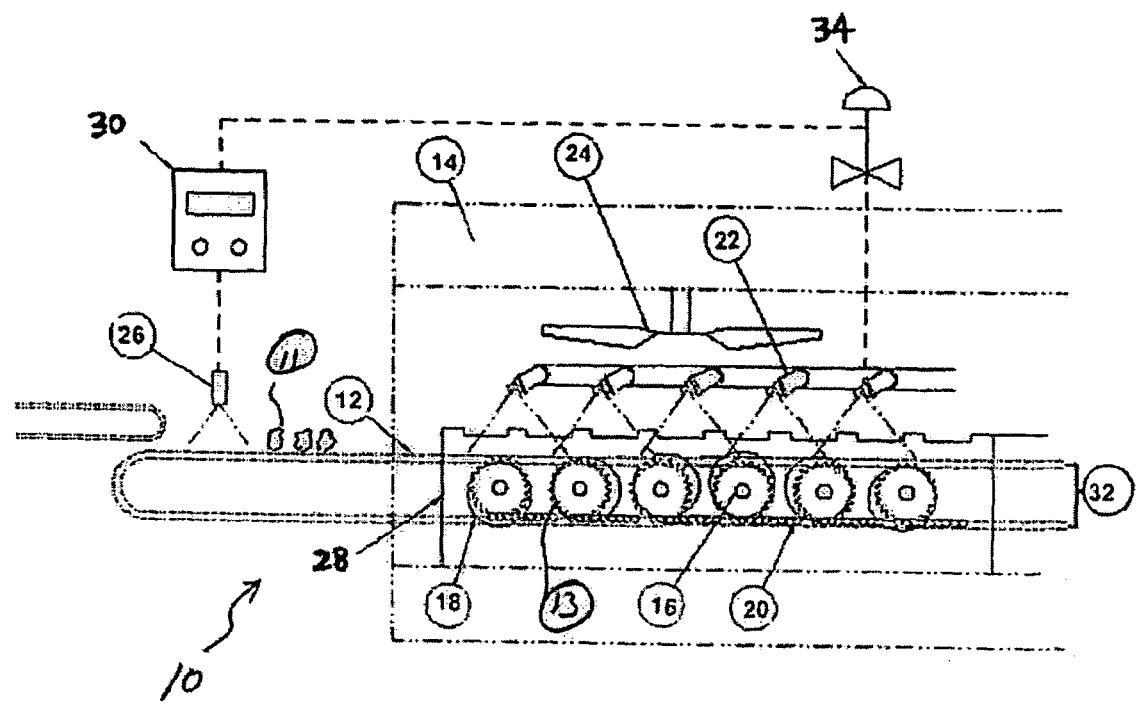
FIG. 1 shows an apparatus for chilling and freezing different types of individual quick-frozen food products.

The apparatus for cooling products; while conveying, such as a tray product in such a way so as not to disturb the product or products contained in the tray, or selectively agitate product which is disposed upon the conveyor to be individually quick frozen (IQF). The apparatus is suitable for use in chilling and freezing food products such as for example, meat, chicken and seafood products. As used herein, cooling refers to a temperature reduction of a product to either chilling or freezing, depending on the total heat extraction from the product.

The apparatus comprises a sophisticated arrangement of at least one cam and a conveyor, such as a conveyor belt, which produces an agitation or vibration that provides intermittent contact between the conveyor and the food products, while the food products are being conveyed through the cooling and freezing equipment. A method of using the apparatus shown conveying a product, whether IQF or in trays, so as not to disturb the product in the trays. The system allows the flexibility of IQF or freezing in trays with one touch of a button.

The apparatus provides a system for chilling or freezing products, and comprises a conveyor, such as a conveyor belt, that transports the products through refrigeration, such as mechanical refrigeration or a refrigerated medium for chilling or freezing the products, but with the additional feature of actuating or agitating the belt through an agitation assembly comprising an agitation means. In certain embodiments, the agitation means comprises a camshaft. The employed agitation means makes selective, intermittent contact with the conveyor, displacing the conveyor from its plane of travel, thereby displacing the products on the conveyor during freezing to prevent products from adhering to the conveyor or to other products being conveyed. Agitation of the conveyor and injection of any refrigeration medium can take place in the same or different zones.

The system can freeze and convey different types of food products, and in various product forms; so as not to adversely affect the integrity of the product while being conveyed through the system. The food products may be IQF or non-IQF, and by way of example, raw or cooked, may require specific shape and orientation, may be breaded or unbreaded, marinated or unmarinated, or food products comprising any type of coating.

In one embodiment, the system is flexible in that it can switch between IQF and non-IQF products, including but not limited to, products that can tolerate layering in the freezer, wherein they are conveyed and quick frozen by the apparatus.

The apparatus and method may employ the total conveyor area for utilization of the capacity, without allowing food product to be removed from sections of the conveyor between the inlet and outlet of the freezer housing and the freezing zone, regardless of the product/process type. The freezing zone may comprise a single freezing zone or multiple freezing zones wherein the temperature of the product is reduced to about or below the freezing point of the product. The apparatus of the present invention may include one or a plurality of chilling or freezing zones.

In one embodiment of the system, the agitation assembly utilizes an agitation means such as at least one cam, each one of which may be mounted to a corresponding shaft connected for rotation to a drive means such as a chain. In another embodiment, the agitation assembly includes intermediate members that are positioned between the cam or cams and the conveyor, such that the intermediate member can contact and translate the impact of the cam to the load carrying part of the conveyor. The cam has an irregular form such that its motion imparts a rocking or reciprocating motion to a part or parts in contact with it, such as the conveyor. The agitation means imparts to the conveyor a forward component of velocity, such that each agitation means contacts the belt at select time intervals. In certain embodiments, a pulse like motion may be produced through the conveyor (and such motion observed) when at least one agitation means contacting the conveyor is out of phase with at least one other agitation means.

The agitation means may be set such that the agitation in the adjacent sections can be in phase or out of phase, whereby a pulse like motion is set up through the conveying system. Additionally, the amplitude and the frequency of the pulse may be varied by adjusting the degree of interaction between the conveying mechanism (e.g., belt) and the agitation means (e.g., cam).

The agitation of the product may maximize product surface area exposed to the refrigeration medium, in which the refrigeration medium works either intermittently, simultaneously or continuously with the agitation. In certain embodiments of the system, the agitation assembly is present either in part of or along the entire length of the conveying section and the refrigeration equipment housing. In other embodiments, the agitation assembly is present so as to provide the conveying mechanism with alternating sections of non-agitating sections followed by agitating sections, or agitating sections followed by non-agitating sections, or in any desired arrangement.

The agitation increases the heat transfer rates by maximizing the product surface area exposed to the refrigeration medium, that is normally not achieved when the product is touching other products or parts of the conveying mechanism. This results in more uniform heat transfer, leading to shorter freezing times, improved yields, higher product quality, and better cryogenic efficiency. A 50 to 100% increase in heat transfer rates and 25 to 50% decrease in dwell times may be achieved compared to existing freezing equipment.

Figure 2:
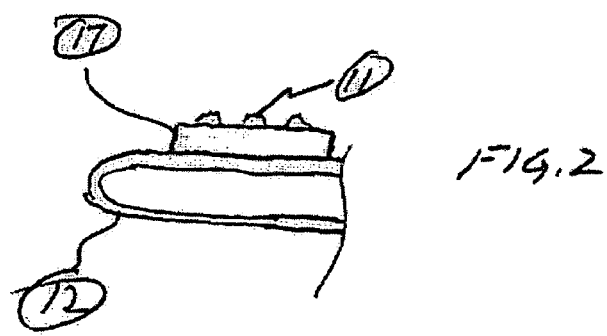
FIG. 2 shows a portion of the apparatus with the food product contained in trays.
Figure 3:
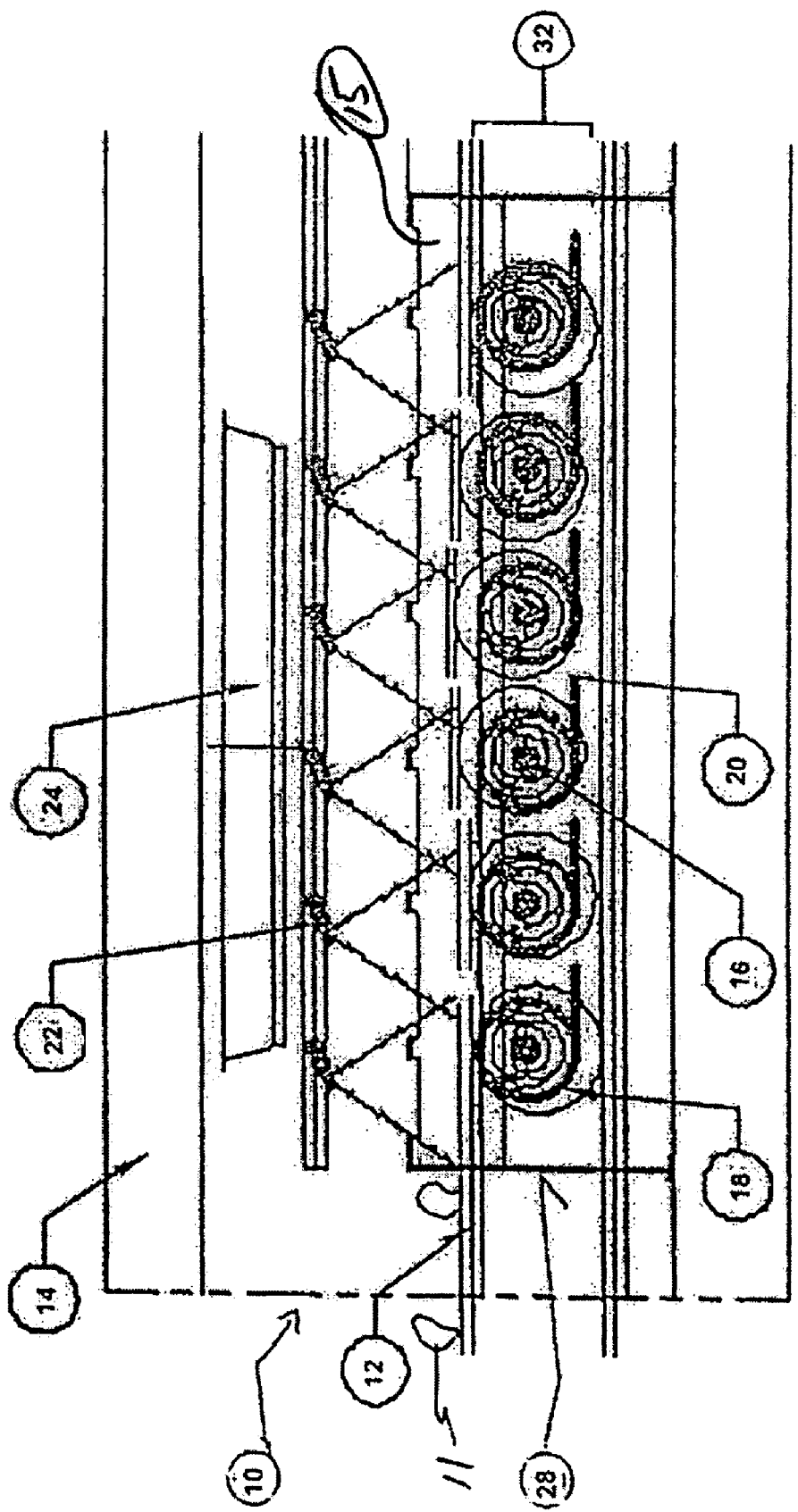
FIG. 3 shows a view of the conveyor and agitation means of the apparatus of FIG. 1.

Referring to FIGS. 1 to 3, the apparatus 10 is shown generally, and may be incorporated into a typical belt freezer. The apparatus 10 includes a conveyor belt 12 to move product 11 through the freezer housing 14. The conveyor belt 12 may be continuous as it passes through the length of the freezer housing 14, or it may comprise several conveyor belts 12 with product transfers appropriate for handling product on trays. The housing 14, is cooled by mechanical refrigeration, carbon dioxide or nitrogen, or some other means using a refrigeration medium, including a combination of cryogenic and mechanical refrigeration techniques. In FIG. 1, a carbon dioxide or nitrogen spray outlet 22 provides the refrigeration medium.

An agitation assembly 32 is provided to agitate or vibrate the product conveyed on the conveyor belt 12 to produce an IQF freeze. The agitation assembly 32 comprises a plurality of cams 18. A section comprising the cams 18 runs either along the entire section of the freezer housing 14, or a portion thereof. Each of the cams 18 is mounted on a corresponding rotating shaft 16 (or a conveyor belt shaking support system; not shown in FIG. 1). The agitation assembly 32 may be constructed and arranged with an interlocking mechanism to agitate the conveyor belt 12. The agitation assembly 32 comprises the cams 18 and shafts 16, and is driven by chains 20 or any other power transmission mechanism.

Rotation of the cams 18 causes them to contact the conveyor belt 12 at select intervals of time, such contact displacing the conveyor belt 12 from its plane of travel. The rotating sequence of the cams 18 may be staggered (i.e., in-phase and out of phase), and their intermittent, but repetitive impact on the conveyor belt 12 causes same to rise above the plane of travel, providing a vibratory/agitating movement of the conveyor belt 12. Such action prevents the product traveling along the conveyor belt 12 from adhering to the conveyor belt 12 or to one another.

The conveyor belt 12 may also be vibrated by agitating the frames or supports 28 using any other vibrating or agitation means, e.g., mechanical, hydraulic, pneumatic, electro-magnetic, etc.

In one embodiment, when products for which vibration or agitation is not desired are processed in the freezer (e.g., for products in trays 17, FIG. 2), disengaging the cams 18 from the conveyor belt 12 ceases the vibration/agitation. When vibration or agitation is desired, the cams 18 contact the conveyor belt 12 when actuated and rotated or otherwise moved to a position where they intermittently contact and displace the conveyor belt 12. Circulation means such as fans 24 may be used to enhance heat transfer in either IQF or tray mode of operation.

Operatively, as shown in FIG. 4, the conveyor belt 12 is supported by an upper belt running rail 36 and a lower running rail 38. Raising the upper belt running rail 36 increases the distance between the edge of the conveyor belt 12 and the cam 18 such that cam 18 does not contact the conveyor belt 12. In this embodiment, the cam 18 does not result in repetitive impact on the conveyor belt 12 to cause the conveyor belt 12 to rise above the plane of travel. A carrier, such as a tray 17 (as shown in FIG. 2), can be placed on the conveyor belt 12 without the possibility of falling off the conveyor belt 12 by any vibratory/agitation movement of the conveyor belt 12.

As shown in FIG. 5, the upper belt running rail 36 may be lowered to lower the distance between the edge of the conveyor belt 12 and the cam 18, such that cam 18 impinges onto the lower surface of the conveyor belt 12. In this embodiment, the cam 18 results in repetitive impact on the conveyor belt 12 to cause the conveyor belt 12 to rise above the plane of travel. In one embodiment, IQF products may be placed on the surface of the conveyor belt 12 for chilling or freezing to prevent the IQF from adhering from one another.

In another embodiment, when vibration or agitation is not necessary for processing of the food products, the conveyor belt 12 can be moved or displaced away from the cams 18, while the cams 18 may continue to move. In this arrangement, the conveyor belt 12 is not subjected to the displacing motion of the cams 18, and can thereby travel along a continuous plane of travel. When it is again desirable to vibrate or agitate the conveyor belt 12, the conveyor belt 12 and/or the cams 18 are moved into position so the cams 18 resume contact with the conveyor belt 12 in an intermittent manner.

In another embodiment, the agitation assembly comprising the cam 18 may be permanently held in position relative to the conveyor belt 12 to perform only the IQF mode of operation.

In a further embodiment, the agitation assembly includes at least one intermediate member (not shown) that may be disposed between the conveyor belt 12 and cams 18 in such a manner that the rotation of the cams 18 contacts the intermediate member, and the impact causes the intermediate member to contact the conveyor belt 12, causing the conveyor belt 12 to rise above the plane of travel, providing a vibratory/agitating movement of the conveyor belt 12. When vibration/agitation is not necessary for processing of the food products, the intermediate member(s) can be moved or displaced away from the cams 18, while the cams 18 may continue to move. This way, the conveyor belt 12 is not subjected to the displacing motion of the cams translated through the intermediate member(s), and can thereby travel along a continuous plane of travel. When it is again desirable to vibrate the conveyor belt 12, the intermediate member(s) are moved into position so the cams 18 resume contact with the intermediate member(s).

In a further embodiment, the conveyor belt 12 is disposed at an angle to the horizontal and may comprise multiple conveyor sections, with transfers of product between the sections. Each section can be agitated/actuated or non-agitated/actuated as desired by the apparatus 10.

On the conveyor belt 12 may be a retaining means (not shown) for retaining products on the conveyor belt 12. These retaining means are generally known to those skilled in the art, and include, for example, projections raised above the top surface of the conveyor belt 12.

Adjacent to the conveyor belt 12 may be means such as sidewalls 15 or guard rails to retain the product being displaced on the surface of the conveying mechanism, while the product is traveling through the equipment housing. The guard rails can be folded to allow access to the conveyor belt 12.

In certain embodiments, the agitation assembly may include self-propelling mechanisms to effectuate movement of the cam 18 without outside power.

In another embodiment, each of the cams 18 may comprise an individual motor.

The process may include estimating the product heat load so as to control the degree of cryogen injection. One embodiment utilizes a weigh scale or a laser or any other optical measuring means that estimates/calculates the volume/weight of the product, or other characteristics of same, so as to control the amount of injection of the refrigeration medium conducive to that product. This embodiment may use a sensor 26 to sense the throughput of the product, the sensor utilizes a controller 30 to actuate the valve 34, which controls the amount of cryogen injection.

The agitation and the injection of any refrigeration medium may take place in the same freezing zone or in different freezing zones. The temperature established in the freezing zone may be isothermal, co-current or counter-current. Convective processes may be used to disperse the refrigeration medium uniformly in the freezing zone for better heat transfer. Such processes can utilize, but are not limited to, fans, impingement or directed gas jets to disperse the refrigeration medium.

The freezer apparatus 10 of the invention permits a user to consolidate separate freezer lines (of IQF and trayed products) by being able to switch or alternate between the "vibratory" mode and the non-vibrating or "tunnel" mode.

In summary, depending upon the geography for which particular freezing applications are to be employed, the invention ensures that frozen food products will not adhere to one another, the conveyor or the tray transporting the food products during freezing.

It will be understood that the embodiment(s) described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

What is claimed is:

1. An apparatus for chilling or freezing products comprising:
   a conveyor for transporting the products through a refrigeration medium for chilling or freezing the products;
   agitation means disposed proximate to the conveyor for selective, intermittent contact with the conveyor to displace the conveyor from a plane of travel, thereby displacing the products on the conveyor during chilling or freezing to prevent the products from adhering to the conveyor or other of the products during chilling or freezing, at least one of the agitation means and the conveyor constructed and arranged to be positioned away from each other for the conveyor to move uninterrupted along the plane of travel; and
   drive means operatively associated with the agitation means to move the agitation means to displace the conveyor and the products thereon.

2. The apparatus according to claim 1, wherein the products are food products.

3. The apparatus according to claim 1, wherein the agitation means comprises at least one cam and each of the at least one cam is mounted to a corresponding shaft connected for rotation to the drive means.

4. The apparatus according to claim 1, wherein the drive means comprises a chain.

5. The apparatus according to claim 1, further comprising an intermediate member disposed between the agitation means and the conveyor to transmit the selective, intermittent contact of the agitation means to the conveyor to displace the conveyor from its plane of travel.

6. The apparatus according to claim 1, wherein the conveyor is at an angle with the horizontal and comprises multiple conveyor sections adapted to permit transfer of the products between said multiple conveyor sections.

7. The apparatus according to claim 1, wherein the conveyor comprises alternating agitating and non-agitating sections.

8. The apparatus according to claim 1, wherein the refrigeration medium comprises at least one of mechanical refrigeration or cryogenic refrigeration.

9. The apparatus according to claim 1, wherein the conveyor is additionally displaced by agitating frames or supports by using at least one of mechanical means, hydraulic means, pneumatic means, or electromagnetic means.

10. The apparatus according to claim 1, wherein the conveyor is a belt.

11. The apparatus according to claim 10, wherein the conveyor belt comprises a retaining means for retaining product on the belt.

12. The apparatus according to claim 11, wherein the retaining means comprises at least one guard rail.

13. The apparatus according to claim 1, further comprising means for sensing features of the products to determine the amount of the refrigeration medium to be provided to the products.

14. An apparatus for cooling products comprising:
    a conveyor for transporting the products through a refrigeration medium for cooling the products;
    an agitation assembly that interchangeably engages with the conveyor for selective, intermittent contact with the conveyor so as to displace the conveyor from the plane of travel, or disengages from the conveyor thereby enabling the conveyor to move uninterrupted along the plane of travel; and
    drive means operatively associated with the agitation means to engage or disengage the agitation means to displace the conveyor and the products thereon.

15. The apparatus according to claim 14, wherein the agitation assembly that engages with the conveyor displaces the products on the conveyor to prevent the products from adhering to each other during freezing.

16. The apparatus according to claim 14, wherein the agitation assembly that engages with the conveyor displaces the products on the conveyor to prevent the products from adhering to the conveyor or the products from adhering on the surface of a carrier placed on the conveyor during freezing.

17. The apparatus according to claim 16 wherein the carrier is a tray.

18. The apparatus according to claim 14, wherein the products are food products.

19. The apparatus according to claim 14, wherein the agitation means comprises at least one cam and each of the at least one cam is mounted to a corresponding shaft connected for rotation to the drive means.

20. The apparatus according to claim 19, wherein each of the at least one cam comprises an individual motor.

21. The apparatus according to claim 14, wherein the drive means comprises a chain.

22. The apparatus according to claim 14, further comprising an intermediate member disposed between the agitation means and the conveyor to transmit the selective, intermittent contact of the agitation means tot the conveyor to displace the conveyor from its plane of travel.

23. The apparatus according to claim 14, wherein the refrigeration medium comprises at least one of mechanical refrigeration or cryogenic refrigeration.

24. The apparatus according to claim 14, wherein the conveyor is a belt.

25. The apparatus according to claim 14, further comprising means for sensing features of the products to determine the amount of the refrigeration medium to be provided to the products.

26. A method of individually quick freezing products, comprising:
    conveying products on a conveyor in a freezing zone;
    providing freezing means to the freezing zone; and
    providing agitating means to selectively displace the conveyor along at least part of the conveyed path of travel to prevent the products from adhering to the conveyor or to each other during freezing;
    wherein at least one of the agitating means and the conveyor are constructed and arranged to be positioned away from the other for the conveyor to move uninterrupted along the conveyed path of travel.

27. The method according to claim 26, wherein the agitating means comprises at least one cam imparting force to the conveyor conveying the products.

28. The method according to claim 27, comprising driving the at least one cam mounted to a corresponding shaft connected for rotation.

29. The method according to claim 27, comprising positioning at least one of the conveyor and the at least one cam away from the other for the conveyor to move uninterrupted along the conveyed path of travel.

30. The method according to claim 26, comprising disposing an intermediate member between the agitating means and the conveyor for transmitting the selective, intermittent contact of the at least agitating means to the conveyor to displace the conveyor from the conveyed path of travel and positioning the intermediate member away from the conveyor for the conveyor to move uninterrupted along its plane of travel.

31. The method according to claim 27, comprising producing a pulse-like motion through the conveyor when the at least one cam contacting the conveyor is out of phase with at least one other cam.

32. The method according to claim 31, comprising varying amplitude and frequency of the pulse like motion by adjusting a degree of interaction between the conveyor and the at least one cam.

33. The method according to claim 26, wherein the freezing means is at least one of mechanical refrigeration or cryogenic refrigeration.

* * * * *

UNITED STATES PATENT AND TRADEMARK OFFICE
CERTIFICATE OF CORRECTION

PATENT NO. : 7,296,431 B2  
APPLICATION NO. : 11/235782  
DATED : November 20, 2007  
INVENTOR(S) : Robert Muscato et al.

Page 1 of 1

It is certified that error appears in the above-identified patent and that said Letters Patent is hereby corrected as shown below:

Column 8, line 32, delete "tot" and insert therefor --to--.

Signed and Sealed this

First Day of April, 2008

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,296,431 B2 | Page 1 of 1 |
| APPLICATION NO. | : 11/235782 | |
| DATED | : November 20, 2007 | |
| INVENTOR(S) | : Robert Muscato et al. | |

It is certified that error appears in the above-identified patent and that said Letters Patent is hereby corrected as shown below:

Col. 7, line 53, delete "conveyor".

Signed and Sealed this
Fourteenth Day of June, 2011

David J. Kappos
*Director of the United States Patent and Trademark Office*